US011909480B2

(12) United States Patent
Zhu et al.

(10) Patent No.: US 11,909,480 B2
(45) Date of Patent: Feb. 20, 2024

(54) METHOD AND APPARATUS FOR NON-CODEBOOK BASED UL TRANSMISSION (71) Applicant: LENOVO (BEIJING) LIMITED, Beijing (CN)

(72) Inventors: Chenxi Zhu, Fairfax, VA (US); Bingchao Liu, Beijing (CN); Wei Ling, Beijing (CN); Yingying Li, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 145 days.

(21) Appl. No.: 17/040,605

(22) PCT Filed: Mar. 23, 2018

(86) PCT No.: PCT/CN2018/080321
§ 371 (c)(1),
(2) Date: Sep. 23, 2020

(87) PCT Pub. No.: WO2019/178867
PCT Pub. Date: Sep. 26, 2019

(65) Prior Publication Data
US 2021/0119678 A1 Apr. 22, 2021

(51) Int. Cl.
*H04B 7/06* (2006.01)
*H04B 17/318* (2015.01)
(Continued)

(52) U.S. Cl.
CPC ......... *H04B 7/0626* (2013.01); *H04B 7/0639* (2013.01); *H04B 7/0695* (2013.01);
(Continued)

(58) Field of Classification Search
None
See application file for complete search history.

(56) References Cited

U.S. PATENT DOCUMENTS

2013/0223251 A1 8/2013 Li et al.
2013/0225188 A1* 8/2013 Seo ............... H04W 74/006
455/450

(Continued)

FOREIGN PATENT DOCUMENTS

CN 102316592 A * 1/2012
CN 103597870 A 2/2014
(Continued)

OTHER PUBLICATIONS

Zhang et al., English translation of WO 2011/020235 A1, 2011, WIPO (Year: 2011).*

(Continued)

*Primary Examiner* — Noel R Beharry
*Assistant Examiner* — Rodrick Mak
(74) *Attorney, Agent, or Firm* — Kunzler Bean & Adamson (57) ABSTRACT Method and apparatus for reduction of the signaling/resource overhead caused by SRS transmission in UL are disclosed. One method of a UE for the reduction of the signaling/resource overhead caused by SRS transmission in UL includes performing precoding on UL transmission with a precoding matrix corresponding to a CRI, in the case of a frequency of UL and DL being in a same band and Tx/Rx beam correspondence, wherein, the CRI corresponding to the precoding matrix is determined according to a measurement on DL channel quality; and transmitting a report of the measurement on DL channel quality to a base station.

20 Claims, 6 Drawing Sheets (51) Int. Cl.
  *H04L 1/00* (2006.01)
  *H04W 24/10* (2009.01)
  *H04W 52/16* (2009.01)
  *H04W 72/23* (2023.01)

(52) U.S. Cl.
  CPC ......... *H04B 17/318* (2015.01); *H04L 1/0003* (2013.01); *H04W 24/10* (2013.01); *H04W 52/16* (2013.01); *H04W 72/23* (2023.01)

(56) References Cited

U.S. PATENT DOCUMENTS

| | | | |
|---|---|---|---|
| 2015/0372741 A1* | 12/2015 | Kim | H04B 7/0641 370/329 |
| 2018/0092129 A1* | 3/2018 | Guo | H04W 56/0005 |
| 2018/0102827 A1* | 4/2018 | Noh | H04B 7/0695 |
| 2018/0219664 A1* | 8/2018 | Guo | H04L 5/005 |
| 2018/0270698 A1* | 9/2018 | Babaei | H04W 72/1284 |
| 2019/0068252 A1* | 2/2019 | Chen | H04W 72/048 |
| 2019/0182001 A1* | 6/2019 | Lee | H04W 72/21 |
| 2019/0245608 A1* | 8/2019 | Kakishima | H04W 88/02 |
| 2020/0245166 A1* | 7/2020 | Kwak | H04B 7/024 |
| 2021/0045076 A1* | 2/2021 | Tomeba | H04L 27/26 |

FOREIGN PATENT DOCUMENTS

| | | | | |
|---|---|---|---|---|
| CN | 103765792 A | 4/2014 | | |
| CN | 105308879 A | 2/2016 | | |
| CN | 105978677 A | 9/2016 | | |
| CN | 107733491 A | 2/2018 | | |
| WO | WO-2011020235 A1 * | 2/2011 | ............ | H04B 17/24 |

OTHER PUBLICATIONS

Intel Corporation, "On non-codebook Based UL Transmission", R1-1712538, 3GPP TSG RAN WG1 Meeting #90, Aug. 21-25, 2017, pp. 1-5, Prague, P.R. Czechia.
Huawei, Hisilicon, "Non-codebook based transmission for UL MIMO", R1-1712229, 3GPP TSG RAN WG1 Meeting #90, Aug. 21-25, 2017, pp. 1-8, Prague, Czech Republic.
Intel Corporation, "On non-codebook Based UL Transmission", R1-1710519, 3GPP TSG RAN WG1 NR Ad Hoc Meeting, Jun. 27-30, 2017, pp. 1-4, Qingdao, China.
Huawei, "UL beam management", R1-1704231, 3GPP TSG RAN WG1 Meeting #88b, Huawei, HilSilicon, Apr. 3-7, 2017, pp. 1-7.
PCT/CN2018/080321, "International Search Report and the Written Opinion of the International Search Authority" ISA/CN, State Intellectual Property Office of the P.R. China, Sep. 26, 2018, pp. 1-9.

* cited by examiner

METHOD AND APPARATUS FOR NON-CODEBOOK BASED UL TRANSMISSION

FIELD

The subject matter disclosed herein relates generally to wireless communication and more particularly relates to non-codebook based UL transmission.

BACKGROUND

The following abbreviations and acronyms are herewith defined, at least some of which are referred to within the following description.

Third Generation Partnership Project ("3GPP"), 5G New Radio ("5G NR"), Angle of Arrival ("AOA"), Angle of Departure ("AOD"), Codebook ("CB"), Channel Busy Ratio ("CBR"), Channel State Information-Reference Signal ("CSI-RS"), CSI-RS Resource Identifier ("CRI"), Downlink Control Information ("DCI"), Demodulation Reference Signal ("DMRS"), Downlink ("DL"), Evolved Node B ("eNB"), Fifth Generation Mobility Communication ("5G"), Frequency Division Duplex ("FDD"), Frequency-Division Multiplexing ("FDM"), Frequency Division Multiple Access ("FDMA"), Generation Node B ("gNB"), Long Term Evolution ("LTE"), LTE Advanced ("LTE-A"), Modulation and Coding Scheme ("MCS"), Physical Downlink Control Channel ("PDCCH"), Physical Downlink Shared Channel ("PDSCH"), Physical Uplink Control Channel ("PUCCH"), Physical Uplink Shared Channel ("PUSCH"), Radio Resource Control ("RRC"), Radio Remote Unit ("RRU"), Reference Signal Receiving Power ("RSRP"), Receive Signal Strength Indicator ("RSSI"), Receive ("Rx"), Scheduling Assignment ("SA"), Signal to Interference plus Noise Ratio ("SINR"), Sounding Reference Signal ("SRS"), SRS Resource Identifier ("SRI"), Time Division Duplex ("TDD"), Time-Division Multiplexing ("TDM"), Transmit Receive Point (TRP), Transmission Time Interval ("TTI"), Transmit ("Tx"), User Entity/Equipment (Mobile Terminal) ("UE"), Uplink ("UL"), Universal Mobile Telecommunications System ("UMTS"), Multiple-Input Multiple-Output ("MIMO").

In Release 15 (Rel-15), the first set of 5G standards is delivered, including new features as well as maturing of the LTE-Advanced Pro specifications. Peak data rate of Giga bit/s, latency of milliseconds, power efficiency on both UE and base station side, etc. are defined as goals of 5G NR. To meet the goals, more efficient signaling transmission is being studied.

One of the objectives for this study is the reduction of signaling overhead caused by SRS transmission in the scenario of non-CB based UL transmission, especially in the case of transmission/Receiving (Tx/Rx) beam correspondence between TRP and UE. In a legacy design for the non-CB based UL transmission, the UL transmission is precoded with a precoding matrix corresponding to an identifier of SRS (SRI), which requires SRS transmission from UE to a network equipment such as gNB. However, with a support of beamforming, Tx/Rx beam correspondence can be utilized to save signaling/resource overhead caused by the SRS transmission in UL.

In another aspect, also with a support of beamforming, a base station such as gNB can predict the Rx beam thereof and further determine UL scheduling corresponding to the Rx beam, based on a received report of measurement on CSI-RS transmitted in DL, instead of the SRS transmission in UL.

BRIEF SUMMARY

SRS usually occupies the last symbol of a slot and the whole UL bandwidth assigned to a UE. Given that there are 7 symbols per slot in a regular case of LTE system, the ratio of resource overhead caused by SRS to the whole resource is more than 14%. Thus it's necessary to reduce SRS transmission in UL to improve resource efficiency and data rate. In the present disclosure, with regard to the scenario of non-CB based UL transmission, enhancements to reduction of the signaling/resource overhead caused by SRS transmission in UL is based on a loose UL/DL channel symmetry and beam correspondence, especially in the case of beamforming in which Tx/Rx beam correspondence between TRP and UE is present. In that way, UL channel quality can be predicted from DL channel quality, which is reflected by the result of measurement on CSI-RS. In another aspect, UL scheduling can also be determined by the base station according to the result of measurement on CSI-RS rather than SRS.

Method and apparatus for reduction of the signaling/resource overhead caused by SRS transmission in UL are disclosed. One method of a UE for the reduction of the signaling/resource overhead caused by SRS transmission in UL includes performing precoding on UL transmission with a precoding matrix corresponding to a CRI, in the case of a frequency of UL and DL being in a same band and Tx/Rx beam correspondence, wherein, the CRI corresponding to the precoding matrix is determined according to a measurement on DL channel quality; and transmitting a report of the measurement on DL channel quality to a base station.

In another aspect, the method of the UE includes calculating a power offset between UL and DL based on a difference between UL transmission power and DL CSI-RS transmission power, as well as a difference between Tx antenna/circuit gain and Rx antenna/circuit gain; and transmitting the power offset between UL and DL. Further, the CRI corresponding to the precoding matrix is determined according to the measurement on DL channel quality and the power offset between UL and DL.

In another aspect, the method of base station for the reduction of the signaling/resource overhead caused by SRS transmission in UL includes receiving a report of measurement on DL channel quality from a UE; and determining ports used for UL transmission based on the report of the measurement on DL channel quality.

In another aspect, the method of the base station includes receiving a power offset between UL and DL from the user equipment, wherein, the power offset between UL and DL is based on a difference between UL transmission power and DL CSI-RS transmission power, as well as a difference between Tx antenna/circuit gain and Rx antenna/circuit gain; and determining ports used for UL transmission based on the report of the measurement on DL channel quality and the power offset between UL and DL.

The method and apparatus herein saves SRS transmission in UL to improve resource efficiency and date rate in the case of loose UL/DL channel symmetry and beam correspondence, especially in the case of beamforming in which Tx/Rx beam correspondence between TRP and UE, with regard to the scenario of non-CB based UL transmission. The power offset is also considered to accurately predict Rx beam and the corresponding UL scheduling at the base station. Particularly, the disclosure herein contributes to meet the design goals of peak data rate, latency, and power efficiency of 5G in which massive MIMO is supported with beamforming. The disclosure herein can be applied to but not limited to 5G system.

BRIEF DESCRIPTION OF THE DRAWINGS

A more particular description of the embodiments briefly described above will be rendered by reference to specific embodiments that are illustrated in the appended drawings. Given that these drawings depict only some embodiments and are not therefore to be considered to limit scope, the embodiments will be described and explained with additional specificity and detail through the use of the accompanying drawings, in which.

DETAILED DESCRIPTION

As will be appreciated by one skilled in the art, aspects of the embodiments may be embodied as a system, apparatus, method, or a program product. Accordingly, embodiments may take the form of an all-hardware embodiment, an all-software embodiment (including firmware, resident software, micro-code, etc.) or an embodiment combining software and hardware aspects.

For example, the disclosed embodiments may be implemented as a hardware circuit comprising custom very-large-scale integration ("VLSI") circuits or gate arrays, off-the-shelf semiconductors such as logic chips, transistors, or other discrete components. The disclosed embodiments may also be implemented in programmable hardware devices such as field programmable gate arrays, programmable array logic, programmable logic devices, or the like. As another example, the disclosed embodiments may include one or more physical or logical blocks of executable code which may, for instance, be organized as an object, procedure, or function.

Furthermore, embodiments may take the form of a program product embodied in one or more computer readable storage devices storing machine readable code, computer readable code, and/or program code, referred to hereafter as code". The storage devices may be tangible, non-transitory, and/or non-transmission. The storage devices may not embody signals. In a certain embodiment, the storage devices only employ signals for accessing code.

Any combination of one or more computer readable medium may be utilized. The computer readable medium may be a computer readable storage medium. The computer readable storage medium may be a storage device storing the code. The storage device may be, for example, but is not limited to being, an electronic, magnetic, optical, electromagnetic, infrared, holographic, micromechanical, or semiconductor system, apparatus, or device, or any suitable combination of the foregoing.

A non-exhaustive list of more specific examples of the storage device may include the following: an electrical connection having one or more wires, a portable computer diskette, a hard disk, a random-access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain or store a program for use by or in connection with an instruction execution system, apparatus, or device.

Reference throughout this specification to "one embodiment", "an embodiment", or similar language means that a particular feature, structure, or characteristic described in connection with the embodiment is included in at least one embodiment. Thus, appearances of the phrases "in one embodiment", "in an embodiment", and similar language throughout this specification may, but do not necessarily, all refer to the same embodiment, but mean "one or more but not all embodiments" unless expressly specified otherwise. The terms "including", "comprising", "having", and variations thereof mean "including but not limited to", unless expressly specified otherwise. An enumerated listing of items does not imply that any or all of the items are mutually exclusive, unless expressly specified otherwise. The terms "a", "an", and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions—executed via the processor of the computer or other programmable data processing apparatus—create a means for implementing the functions/acts specified in the schematic flowchart diagrams and/or schematic block diagrams.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams.

The code may also be loaded onto a computer, other programmable data processing apparatus, or other devices to cause a series of operational steps to be performed on the computer, other programmable apparatus, or other devices to produce a computer implemented process such that the code executed on the computer or other programmable apparatus provides processes for implementing the functions/acts specified in the schematic flowchart diagrams and/or schematic block diagram.

The schematic flowchart diagrams and/or schematic block diagrams in the Figures illustrate the architecture, functionality, and operation of possible implementations of apparatuses, systems, methods, and program products according to various embodiments. In this regard, each block in the schematic flowchart diagrams and/or schematic block diagrams may represent a module, segment, or portion of code, which includes one or more executable instructions of the code for implementing the specified logical function(s). One skilled in the relevant art will recognize, however, that the flowchart diagrams is not required to be practiced in the sequence shown in the Figures, and are able to be practiced without one or more of the specific steps, or with other steps not shown in the Figures.

It should also be noted that, in some alternative implementations, the functions noted in the block may occur out of the order noted in the Figures. For example, two blocks shown in succession may, in fact, be substantially executed in concurrence, or the blocks may sometimes be executed in reverse order, depending upon the functionality involved. Other steps and methods may be conceived that are equivalent in function, logic, or effect to one or more blocks, or portions thereof, to the illustrated Figures.

The description of elements in each figure may refer to elements of proceeding figures. Like numbers refer to like elements in all figures, including alternate embodiments of like elements.

Disclosed herein are methods, apparatuses, and systems that provide a technical solution of reducing signaling/resource overhead caused by SRS transmission in the case of a loose UL/DL channel symmetry and beam correspondence. In one embodiment in which a frequency of UL and DL is in a same band and Tx/Rx beam correspondence is present, the UL channel quality is similar with the DL channel quality, which can be reflected by a L1-RSRP measured on CS-RS for example. In that way, UE can determine a precoding matrix for non-CB UL transmission according to values of L1-RSRP measured on CSI-RS. For example, UE determines the precoding matrix based on a CRI for which the maximum/acceptable values of L1-RSRP measured on the corresponding CSI-RS are obtained. In another aspect, the base station such as gNB can predict UL ports of UE and determine UL scheduling based on a received measurement report including the values of L-RSRP for CSI-RS.

In another aspect, the power offset between DL and UL may impact the determination of precoding matrix by UE, as well as UL ports and UL scheduling by gNB, besides the measurement report/result for L1-RSRP on CSI-RS. In one embodiment, UE calculates the power offset between UL and DL based on a difference between UL transmission power in a power control level thereof and DL CSI-RS transmission power, as well as a difference between Tx antenna/circuit gain and Rx antenna/circuit gain, and the transmits the power offset between UL and DL to gNB.

In another aspect, UE need to be informed available UL ports for the following PUSCH transmission, either in CRI, which indicates a resource configuration for the corresponding CSI-RS, or in a dummy SRI, which indicates a resource configuration for dummy SRS. Further, because different CSI-RS/SRS resources may correspond to different AOAs/AODs for the UE respectively, and may be received/transmitted in separate panels with the corresponding spatial Rx/Tx filter, it may be difficult for UE to perform UL transmission in UL ports corresponding to a same set of resources for CSI-RS simultaneously. It is thus required to set available UL ports corresponding to different sets of resources for CSI-RS which can be transmitted simultaneously.

Figure 1:
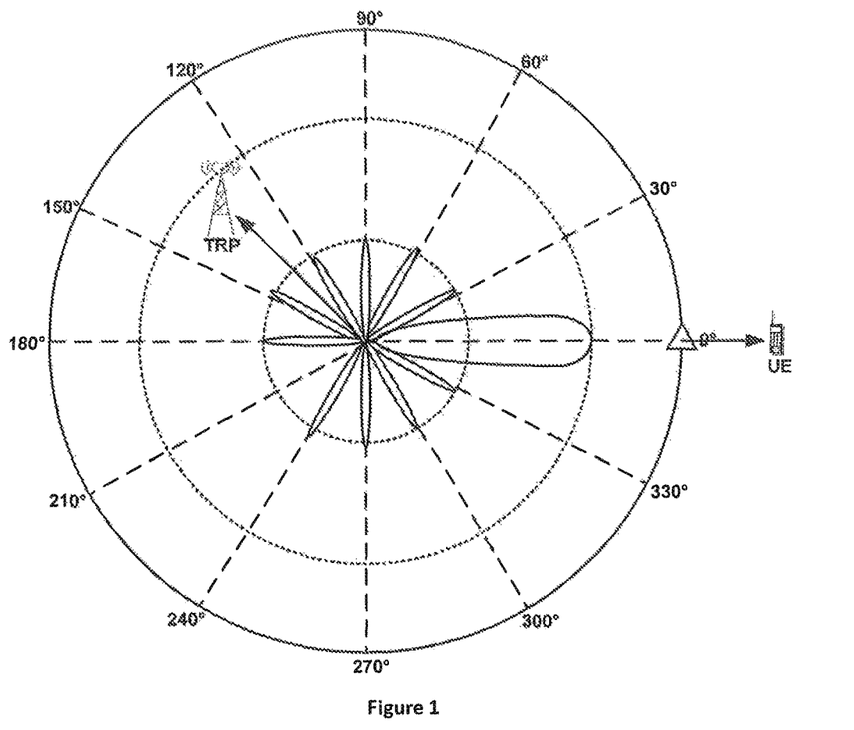
FIG. 1 is a schematic diagram illustrating beamforming.

FIG. 1 is a schematic diagram illustrating beamforming. Beamforming is a signal processing technique used in an antenna array for directional signal transmission or reception. This is achieved by combining elements in an antenna array in such a way that signals at particular angles experience constructive interference while others experience destructive interference. Beamforming can be used at both the TRP, which can be regarded as a RRU of gNB, and UE, in order to achieve spatial selectivity. The improvement compared with omnidirectional reception/transmission is known as the directivity of the antenna array.

To change the directionality of the array in the case of transmitting, a beamformer controls the phase and relative amplitude of the signal at each TRP, in order to create a pattern of constructive and destructive interference in the wavefront. In the case of reception, information from different antennas is combined in a way where the expected pattern of radiation is preferentially observed.

As shown in FIG. 1, a TRP, such as a RRU of gNB, initiates signal in different directions, the signal directing to a angle of 0° is strengthened for the UE at the same angle, and moreover, the signal directing to other angles has limited interference on the signal reception by UE at the angle of 0°.

Figure 2:
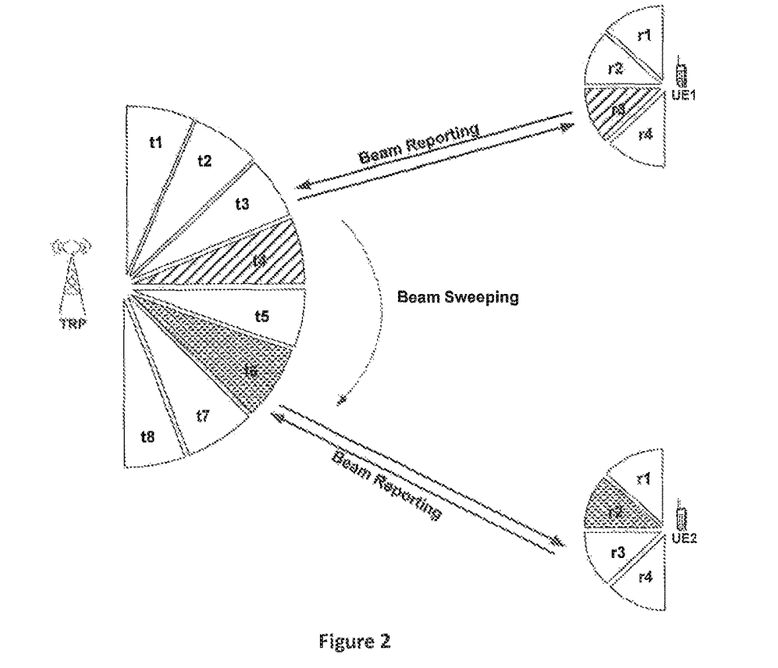
FIG. 2 is a schematic diagram illustrating beam management between TRP and UE.

FIG. 2 is a schematic diagram illustrating beam management between TRP and UE. gNB supports an antenna array in a large scale in order to achieve the design goals, wherein the number of antennas can be increased up to 1024. In another aspect, an antenna array may be supported at UE. To achieve gains for signal reception at a particular angle, beam management is required between TRP and UE. As shown in FIG. 2, TRP transmits signal in beams with different directions, which is also referred as "Beam Sweeping". UE performs measurement on signals from different beams, which is referred as "Beam Measurement" (not shown in the Figure), and then reports information including quality of the received signal to TRP, which is referred as "Beam Reporting". In that way, as described in 3GPP TR 38.802, Tx/Rx beam correspondence is achieved between TRP and UE, including:

TRP is able to determine TRP Rx beam for the uplink reception based on UE's downlink measurement on TRP's one or more Tx beams;

UE is able to determine a UE Tx beam for the uplink transmission based on UE's downlink measurement on UE's one or more Rx beams.

In the case that the beam correspondence is achieved between UE and TRP (gNB), the DL ports/resource corresponding to CSI-RS transmitted in a beam, and the UL ports/resource corresponding to SRS transmitted in the reciprocal beam thereof can be regarded as symmetry, which can be utilized by gNB to determine Rx beam thereof and UL scheduling according to the beam quality report from UE as a part of the beam management process. The beam quality report is also referred as a beam report including L1-RSRP measured on the received one or more CSI-RS, which will be described hereafter.

Figure 3:
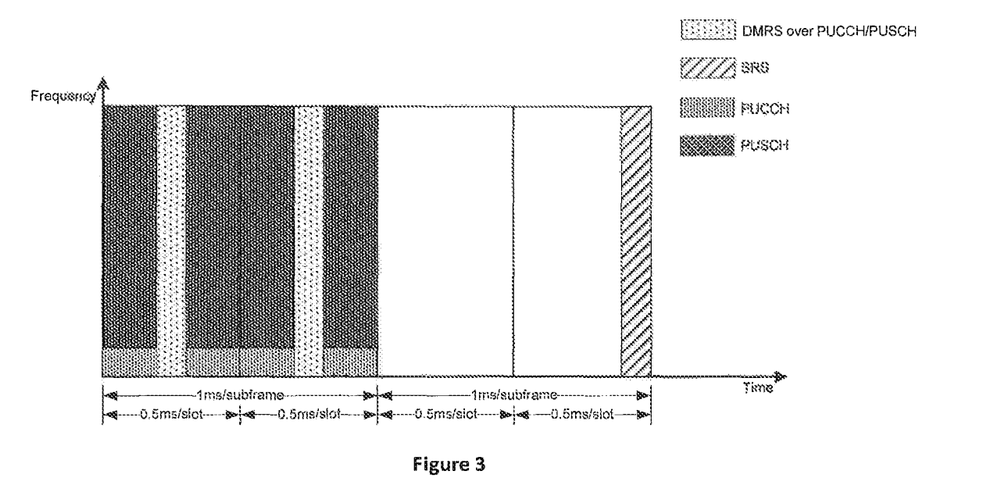
FIG. 3 is a schematic diagram illustrating SRS scheduling in resource for UL.

FIG. 3 is a schematic diagram illustrating SRS scheduling in resource for UL. Two types of reference signals, i.e. DMRS and SRS, are supported on uplink between an gNB and a UE. As shown in FIG. 3, the DMRS is associated with UL transmission for data on PUSCH and/or signaling on the PUCCH, and is primarily used for channel estimation or coherent demodulation. Also, as shown in FIG. 3, which is an example of arrangement for UL resources in LTE, the SRS usually occupies the last symbol of a slot and the whole UL bandwidth assigned to the UE, thereby the result of UL channel measurement based on the SRS, such as RSRP or RSSI, can reflect a thorough UL channel quality so that UL scheduling is enabled based on the measurement result.

However, given that there are 7 symbols per slot in a regular case of LTE system, the ratio of resource overhead caused by SRS to the whole resource is more than 14%. Although the SRS may occupy other symbols of a slot and partial bands in the whole UL bandwidth in the case of 5G, the resource overhead caused thereby should also be saved. Thus it's necessary to reduce SRS transmission in UL to improve resource efficiency and data rate, particularly in the case of loose UL/DL channel symmetry, for example a frequency of UL and DL being in a same band, and beam correspondence.

Figure 4:
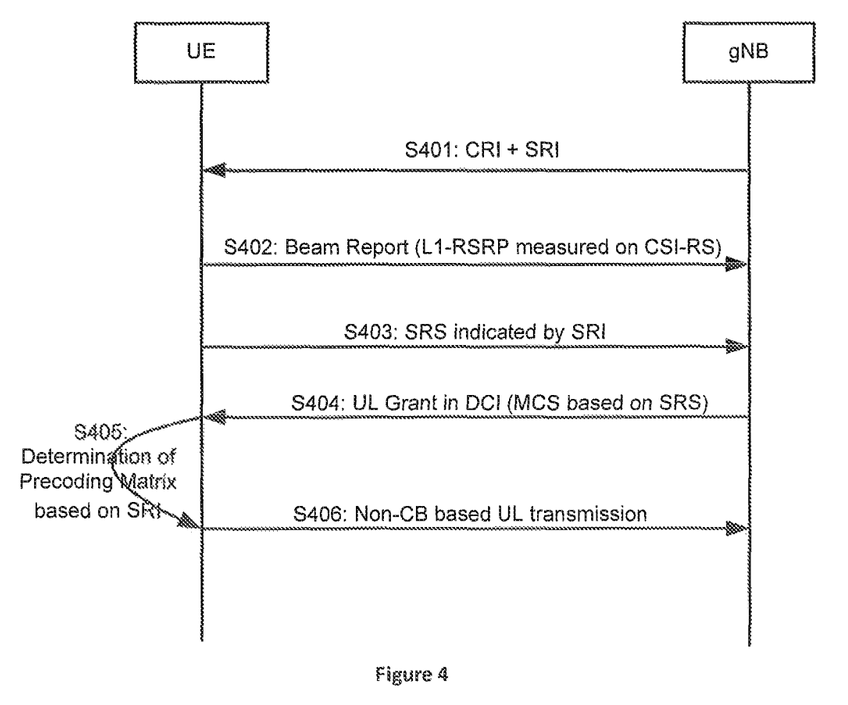
FIG. 4 is a call flow illustrating non-CB based UL transmission according to the first embodiment.

FIG. 4 is a call flow illustrating non-CB based UL transmission according to the first embodiment. As shown in FIG. 4, in step S401, UE receives one or more CRI, which indicate a resource configuration for CSI-RS for DL channel measurement, and one or more SRI, which indicate a resource configuration for SRS for UL channel measurement as well as the corresponding available UL ports, from a base station such as gNB, for example in a higher layer message such as a RRC message. Resources indicated by SRI, which correspond to available UL ports, belongs to different sets of resources for the SRS, so that UE can perform UL transmission in the available UL ports simultaneously.

In step S402, UE transmits a beam report including values of L-RSRP measured on the received one or more CSI-RS, which indicates DL channel quality. Alternatively, the beam report includes other quality indices such as L-RSSI and/or L1-RSRP.

In step S403, UE transmits one or more SRS indicated by the received SRI simultaneously for UL channel measurement by gNB.

In step S404, gNB transmits UL grant in DCI, which indicates UL scheduling of time-frequency resources for the UE and includes MCS based on UL channel quality measured on SRS.

In step S405, UE determines a precoding matrix for non-CB based UL transmission according to SRI. In one embodiment, UE can determine the precoding matrix after receiving the UL grant, with consideration of UL ports and/or a configuration of UL scheduling indicated by gNB based on the UL channel measurement on SRS.

In step S406, UE performs non-CB based UL transmission with the determined precoding matrix based on SRI.

Although it's not shown in FIG. 4, gNB can derive effective channel estimation, i.e. the product of channel matrix and precoding matrix, from DMRS, so that it's unnecessary to transmit the precoding matrix from UE to gNB.

As shown in FIG. 4, SRS transmission is required for UL scheduling by gNB, however, the signaling/resource overhead is also introduced for the SRS transmission. Given that UL/DL channel symmetry as well as beam correspondence is present in some scenarios, UL grant can be determined on the DL channel quality, thereby the SRS transmission can be saved to reduce the signaling/resource overhead.

Figure 5:
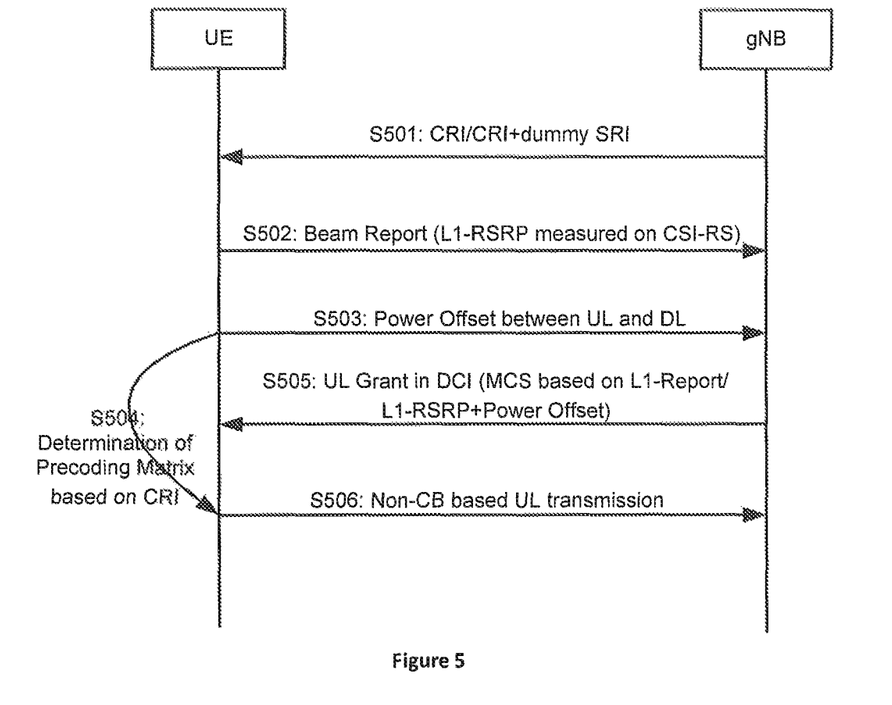
FIG. 5 is a call flow illustrating non-CB based UL transmission according to the second embodiment.

FIG. 5 is a call flow illustrating non-CB based UL transmission according to the second embodiment. As shown in step S501 of FIG. 5, in one embodiment, UE receives one or more CRI, which indicate a resource configuration for CSI-RS for DL channel measurement as well as the corresponding available UL ports, from a base station such as gNB, for example in a higher layer message such as a RRC message. Resources indicated by CRI, which correspond to available UL ports, belongs to different sets of resources for the CSI-RS, so that UE can perform UL transmission in the available UL ports simultaneously.

In step S501, in another embodiment, UE receives one or more CRI, which indicate a resource configuration for CSI-RS for DL channel measurement, and one or more dummy SRI, which indicate a resource configuration for dummy SRS as well as the corresponding available UL ports, from a base station such as gNB, for example in a higher layer message such as a RRC message. The resources for dummy SRS are defined as Quasi-Co-Location ("QCL") with the resource for CSI-RS, for example, the resources for dummy SRS are associated with the resources for the CSI-RS. The purpose of the transmission of the dummy SRI is that the available UL ports can be indicated by the dummy SRI, therefore the dummy SRS corresponding to the dummy SRI actually would not be transmitted by UE.

There are two types of SRS: periodic SRS and aperiodic SRS. The gNB may either request an individual SRS transmission from a UE, or configure a UE to transmit SRS periodically until terminated. In one embodiment, 1-bit UE-specific signaling parameter of 'duration' can be used to indicate whether the requested SRS transmission is a one-time transmission or a periodic transmission. In one embodiment, the mechanism of the transmission of the dummy SRI can be achieved in a way that the corresponding SRS is defined as the aperiodic SRS and would not be triggered by gNB. In another aspect, resources indicated by the dummy SRI, which correspond to available UL ports, belongs to different sets of resources for the dummy SRS, so that UE can perform UL transmission in the available UL ports simultaneously.

In step S502, UE transmits a beam report including values of L-RSRP measured on the received one or more CSI-RS, which indicates DL channel quality. Alternatively, the beam report includes other quality indices such as L-RSSI and/or L1-RSRP.

Given that different transmission/reception power is usually applied to both UL and DL, as well as different gains are usually applied to both Tx and Rx circuits of UE, in step S503, UE calculates a power offset between UL and DL as following, and then transmits the power offset between UL and DL to gNB:

$$O_{UL/DL} = O_{power} + O_{UEcircuit}$$

Wherein, Opower is the difference between UL transmission power per port in a current power control level of UE and DL CSI-RS transmission power per port, and OUEcircuit is the difference between the Tx antenna/circuit gain and Rx antenna/circuit gain of UE.

In step S504, UE determines a precoding matrix for non-CB based UL transmission according to CRI instead of SRI, in the case of loose UL/DL channel symmetry, for example a frequency of UL and DL being in a same band, and beam correspondence. In one embodiment, UE determines the precoding matrix for non-CB UL transmission according to values of L-RSRP measured on CSI-RS. For example, UE determines the precoding matrix based on a CRI for which the maximum/acceptable values of L1-RSRP measured on the corresponding CSI-RS are obtained. In another word, the CRI corresponding to the precoding matrix is determined according to a measurement on DL channel quality.

In another embodiment, UE determines a precoding matrix for non-CB based UL transmission according to the combination of CRI and the calculated power offset between UL and DL, in order to more accurately obtain UL channel quality.

In the case of loose UL/DL channel symmetry, for example a frequency of UL and DL being in a same band, and beam correspondence, in step S505, gNB transmits UL grant in DCI, which indicates UL scheduling of time-frequency resources for the UE and includes MCS based on the report of the measurement on DL channel quality, which includes the values of L1-RSRP measured on the received one or more CSI-RS for example. In another embodiment, gNB determines MCS, which is based on the report of the measurement on DL channel quality and the received power offset between UL and DL. In another embodiment, gNB determines MCS, which is based on the report of the measurement on DL channel quality, the received power offset between UL and DL, and OgNBcircuit which the difference between the Tx antenna/circuit gain and Rx antenna/circuit gain of gNB.

In another aspect, with the report of the measurement on DL channel quality, and/or OUL/DL, and/or OgNBcircuit, gNB is able to predict the UL Rx power thereof and UL Tx power of UE, as well as UL ports of UE, in the case that UE performs UL transmission in the reciprocal beam with the DL beam which carries CSI-RS.

In step S506, UE performs non-CB based UL transmission with the determined precoding matrix based on CRI. Although it's not shown in FIG. 5, gNB can derive effective channel estimation, i.e. the product of channel matrix and precoding matrix, from DMRS, so that it's unnecessary to transmit the precoding matrix from UE to gNB.

Figure 6:
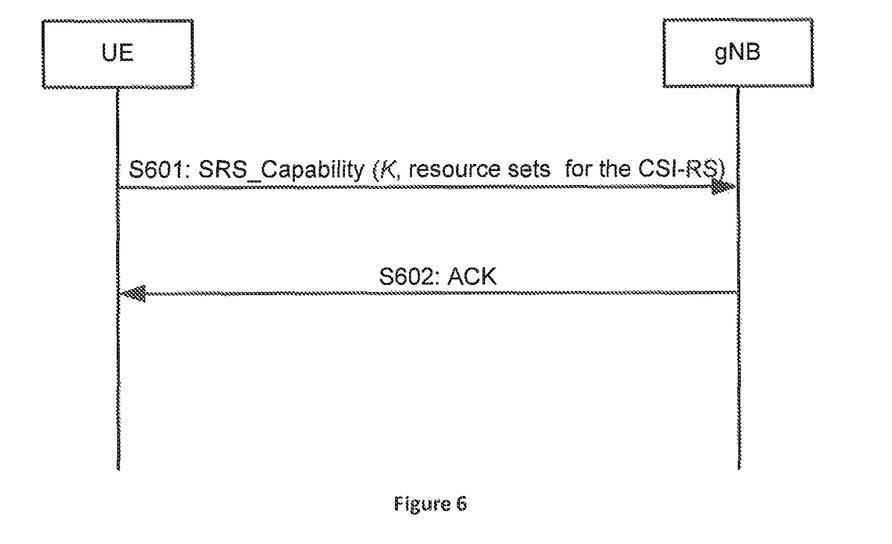
FIG. 6 is a call flow illustrating informing of UE capability relating to supported UL ports according to the third embodiment.

FIG. 6 is a call flow illustrating informing of U capability relating to supported UL ports according to the third embodiment. In the case that UL ports are indicated by dummy SRI, the legacy mechanism of transmission of UE capability relating to supported SRS resources, which is described in 3GPP TS 38.214, can be used. As described in 3GPP TS 38.214, UE can be configured with one or more sets of resource for SRS by a higher layer parameter of SRS-ResourceStConfig. For each SRS resource set, UE may be configured with K (K≥1) SRS resources by a higher layer parameter of SRS-ResourceConfig, wherein the value of K is indicated by a higher layer message of SRS_capability. In the case of the higher layer parameter of SRS-SetUse is set to be 'BeamManagement', only one SRS resource in each of multiple sets of SRS resource can be transmitted at a given time instant. The SRS resources in different sets of SRS resource can be transmitted simultaneously.

In another aspect, in the case that UL ports are indicated by CRI, a mechanism of informing of UE capability relating to supported UL ports is required. As shown in step S601 of FIG. 6, UE transmits a maximum number K of supported UL ports corresponding to resources for the CSI-RS, as well as sets of resources for CSI-RS which can be transmitted simultaneously, to gNB by a higher layer message. In one embodiment, the higher layer message of SRS_capability can be overwritten to carry the information of capability relating to CSI-RS. gNB should configure up to K CRI corresponding to K UL ports in which UL transmission can be performed simultaneously, in the case of transmission of CRI such as step S501. Further, CSI-RS resources corresponding to CRI transmitted by gNB in step S501 should belong to different sets of resources for CSI-RS transmitted by UE in step S601.

In step S602, gNB acknowledges the higher layer message transmitted from UE.

Figure 7:
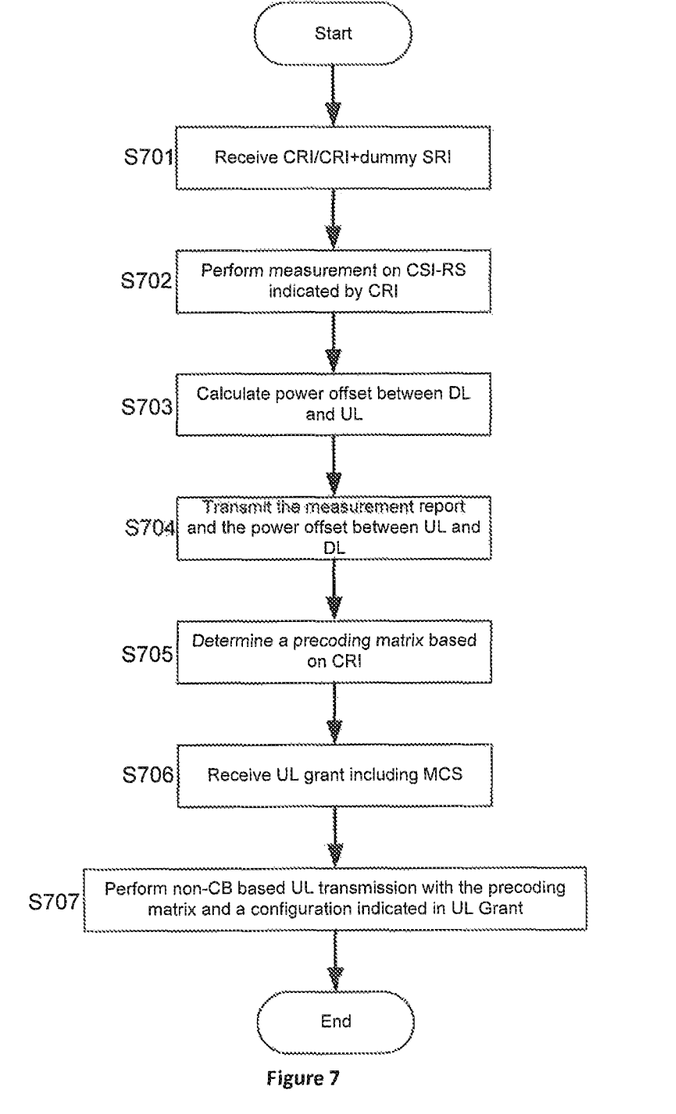
FIG. 7 is a call flow illustrating non-CB based UL transmission by a UE according to the fourth embodiment.

FIG. 7 is a call flow illustrating non-CB based UL transmission by a UE according to the fourth embodiment.

In step S701, UE receives one or more CRI, which indicate a resource configuration for CSI-RS for DL channel measurement as well as the corresponding available UL ports, from a base station such as gNB, for example in a higher layer message such as a RRC message. In another embodiment, UE receives one or more CRI, which indicate a resource configuration for CSI-RS for DL channel measurement, and one or more dummy SRI, which indicate a resource configuration for dummy SRS as well as the corresponding available UL ports, from a base station such as gNB, for example in a higher layer message such as a RRC message.

In step S702, UE performs measurement on CSI-RS indicated by CRI, such as calculates values of L1-RSRP for CSI-RS.

In step S703, UE calculates a power offset between UL and DL based on a difference between UL transmission power and DL CSI-RS transmission power, as well as a difference between Tx antenna/circuit gain and Rx antenna/circuit gain of UE.

In step S704, UE transmits the measurement report to gNB. Alternatively, UE transmits the measurement report and the power offset between UL and DL to gNB.

In step S705, UE determines a precoding matrix based on CRI. Particularly, UE determines the precoding matrix for non-CB UL transmission according to values of L1-RSRP measured on CSI-RS. For example, UE determines the precoding matrix based on a CRI for which the maximum/acceptable values of L-RSRP measured on the corresponding CSI-RS are obtained. In another word, the CRI corresponding to the precoding matrix is determined according to a measurement on DL channel quality.

In step S706, UE receives UL grant including MCS based on the report of the measurement on DL channel quality from gNB.

Figure 8:
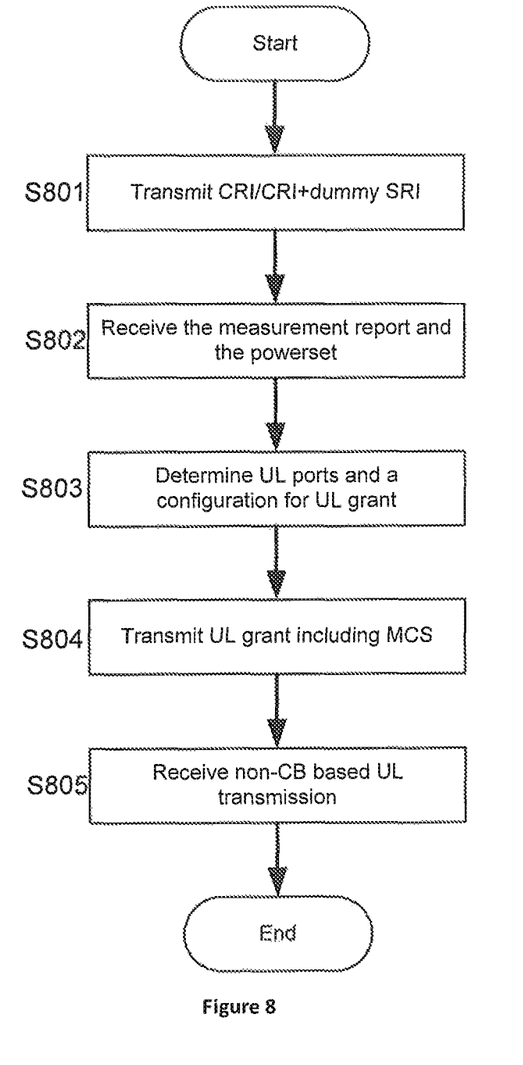
FIG. 8 is a call flow illustrating non-CB based UL reception by a base station according to the fifth embodiment.

In step S707, UE performs non-CB based UL transmission with the precoding matrix and a configuration indicated in UL Grant FIG. 8 is a call flow illustrating non-CB based UL reception by a base station according to the fifth embodiment.

In step S801, a base station such gNB transmits one or more CRI, which indicate a resource configuration for CSI-RS for DL channel measurement as well as the corresponding available UL ports, to UE, for example in a higher layer message such as a RRC message. In another embodiment, gNB transmits one or more CRI, which indicate a resource configuration for oCSI-RS for DL channel measurement, and one or more dummy SRI, which indicate a resource configuration for dummy SRS as well as the corresponding available UL ports, to UE, for example in a higher layer message such as a RRC message.

In step S802, the base station receives the measurement report from UE. Alternatively, the base station receives the measurement report and the power offset between UL and DL from UE.

In step S803, the base station predicts the UL Rx power thereof and UL Tx power of UE, as well as UL ports of UE, and moreover determines a configuration for UL grant, based on the received report of the measurement on DL channel quality, or the combination of the received report of the measurement and power offset between UL and DL, in the case of loose UL/DL channel symmetry, for example a frequency of UL and DL being in a same band, and beam correspondence In step S804, the base station transmits UL grant including MCS to UE.

In step S805, the base station receives non-CB based UL transmission from UE.

One skilled in the relevant art will recognize, however, that the process described from FIGS. 4 and 8 is not required to be practiced in the sequence shown in the Figures, and are able to be practiced without one or more of the specific steps, or with other steps not shown in the Figures.

Figure 9:
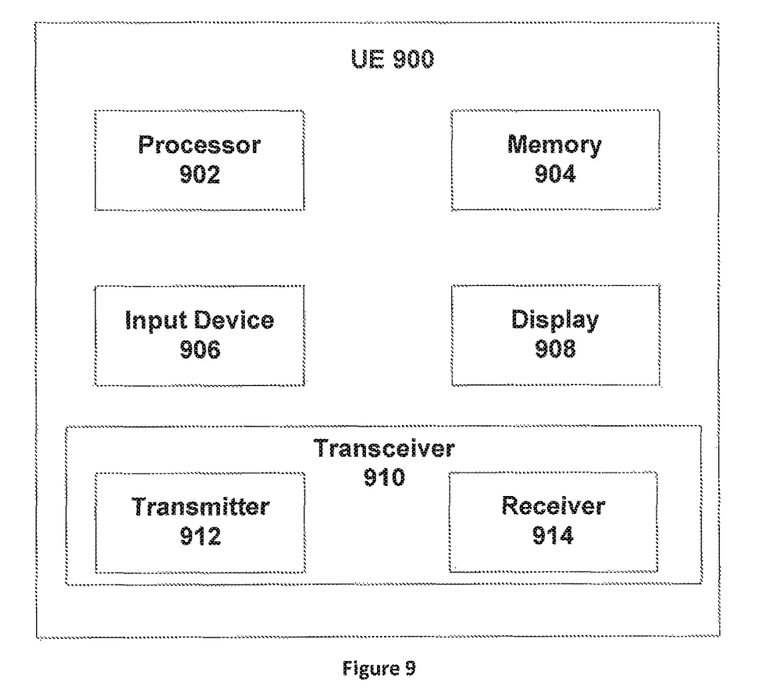
FIG. 9 is a schematic block diagram illustrating components of a UE according to one embodiment.

FIG. 9 is a schematic block diagram illustrating components of a UE according to one embodiment; and UE 900 is an embodiment of UE described from FIG. 4 to FIG. 8. Furthermore, UE 900 may include a processor 902, a memory 904, and a transceiver 910. In some embodiments, UE 900 may include an input device 906 and/or a display 908. In certain embodiments, the input device 906 and the display 908 may be combined into a single device, such as a touch screen.

The processor 902, in one embodiment, may include any known controller capable of executing computer-readable instructions and/or capable of performing logical operations. For example, the processor 902 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 902 executes instructions stored in the memory 904 to perform the methods and routines described herein. The processor 902 is communicatively coupled to the memory 904, the input device 906, the display 908, and the transceiver 910.

In some embodiments, the processor 902 controls the transceiver 910 to receive DL signals from Network Equipment 1000. For example, the processor 902 may control the transceiver 910 to receive the CRI/dummy SRI from an gNB, as described above.

The memory 904, in one embodiment, is a computer readable storage medium. In some embodiments, the memory 904 includes volatile computer storage media. For example, the memory 904 may include a RAM, including dynamic RAM ("DRAM"), synchronous dynamic RAM ("SDRAM"), and/or static RAM ("SRAM"). In some embodiments, the memory 904 includes non-volatile computer storage media. For example, the memory 904 may include a hard disk drive, a flash memory, or any other suitable non-volatile computer storage device. In some embodiments, the memory 904 includes both volatile and non-volatile computer storage media. In some embodiments, the memory 904 stores information of a maximum number K of supported UL ports, as well as sets of resources for CSI-RS which can be transmitted simultaneously. In some embodiments, the memory 904 also stores program code and related data, such as an operating system or other controller algorithms operating on UE 900.

UE 900 may optionally include an input device 906. The input device 906, in one embodiment, may include any known computer input device including a touch panel, a button, a keyboard, a stylus, a microphone, or the like. In some embodiments, the input device 906 may be integrated with the display 908, for example, as a touch screen or similar touch-sensitive display. In some embodiments, the input device 906 includes a touch screen such that text may be input using a virtual keyboard displayed on the touch screen and/or by handwriting on the touch screen. In some embodiments, the input device 906 includes two or more different devices, such as a keyboard and a touch panel. In certain embodiments, the input device 906 may include one or more sensors for monitoring an environment of UE 900.

UE 900 may optionally include a display 908. The display 908, in one embodiment, may include any known electronically controllable display or display device. The display 908 may be designed to output visual, audible, and/or haptic signals. In some embodiments, the display 908 includes an electronic display capable of outputting visual data to a user. For example, the display 908 may include, but is not limited to, an LCD display, an LED display, an OLED display, a projector, or a similar display device capable of outputting images, text, or the like to a user. As another, non-limiting, example, the display 908 may include a wearable display such as a smart watch, smart glasses, a heads-up display, or the like. Further, the display 908 may be a component of a smart phone, a personal digital assistant, a television, a table computer, a notebook (laptop) computer, a personal computer, a vehicle dashboard, or the like.

In certain embodiments, the display 908 may include one or more speakers for producing sound. For example, the display 908 may produce an audible alert or notification (e.g., a beep or chime). In some embodiments, the display 908 includes one or more haptic devices for producing vibrations, motion, or other haptic feedback. In some embodiments, all or portions of the display 908 may be integrated with the input device 906. For example, the input device 906 and display 908 may form a touch screen or similar touch-sensitive display. In other embodiments, the display 908 may be located near the input device 906.

The transceiver 910, in one embodiment, is configured to wirelessly communicate with a base station. In certain embodiments, the transceiver 910 comprises a transmitter 912 and a receiver 914. The transmitter 912 is used to transmit UL signaling/data to the base station and the receiver 914 is used to receive DL signaling/data from the base station. For example, the receiver 914 may receive CRI indicating available UL ports.

The transmitter 912 and the receiver 914 may be any suitable types of transmitters and receivers. Although only one transmitter 912 and one receiver 914 are illustrated, the transceiver 910 may have any suitable number of transmitters 912 and receivers 914. For example, in some embodiments, UE 900 includes a plurality of transmitter 912 and receiver 914 pairs for communicating on a plurality of wireless networks and/or radio frequency bands, each transmitter 912 and receiver 914 pair configured to communicate on a different wireless network and/or radio frequency band than the other transmitter 912 and receiver 914 pairs.

Figure 10:
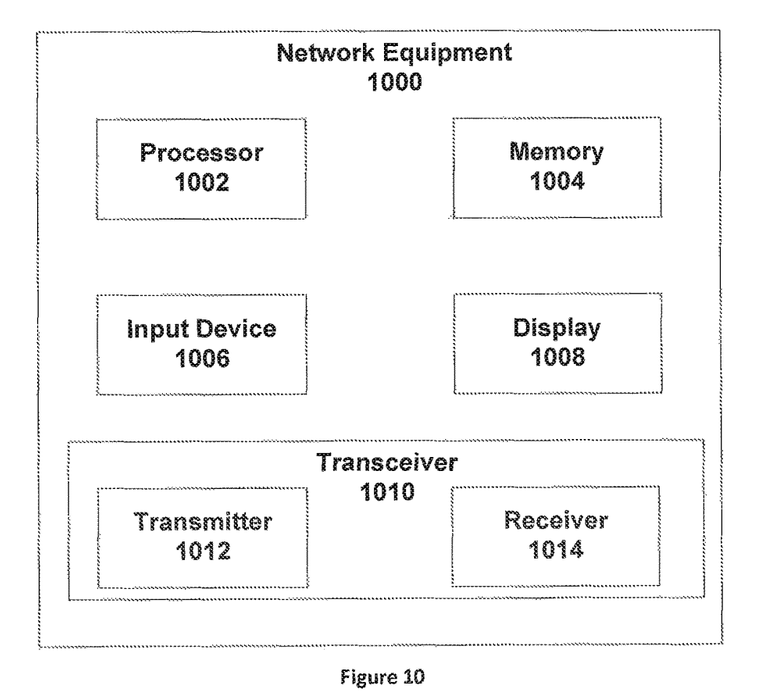
FIG. 10 is a schematic block diagram illustrating components of a network equipment according to one embodiment.

FIG. 10 is a schematic block diagram illustrating components of a network equipment according to one embodiment.

Network Equipment 1000 includes one embodiment of a base station such as gNB mentioned from FIG. 4 to FIG. 8. Furthermore, Network Equipment 1000 may include a processor 1002, a memory 1004, an input device 1006, a display 1008, and a transceiver 1010. As may be appreciated, the processor 1002, the memory 1004, the input device 1006, and the display 1008 may be substantially similar to the processor 902, the memory 904, the input device 906, and the display 908 of UE 900, respectively.

In some embodiments, the processor 1002 controls the transceiver 1010 to transmit DL signals to UE 900 when the UE 900 is in its coverage. For example, the processor 1002 may control the transceiver 1010 to transmit CR/dummy SRI to UE 900 when the UE 900 is in its coverage, as described above.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. An apparatus for wireless communication, the apparatus comprising:
    a transceiver;
    a processor; and
    a memory coupled to the processor, the processor configured to cause the apparatus to:
        receive a channel state information-reference signal (CSI-RS) resource identifier (CRI) that indicates a resource configuration for CSI-RS for downlink (DL) channel measurement;
        measure a layer 1 reference signal received power (L1-RSRP) on the CSI-RS;
        transmit a report of the L1-RSRP measurement to a base station;
        determine a precoding matrix for non-codebook (non-CB) uplink (UL) transmission based on the CRI and the L1-RSRP measurement in response to an UL frequency and a DL frequency being in a same band; and
        perform a non-CB UL transmission using the precoding matrix.

2. The apparatus according to claim 1, wherein;
    the processor calculates a power offset between uplink and downlink based on a difference between uplink transmission power and downlink channel state information-reference signal transmission power, as well as a difference between transmission antenna/circuit gain and receiving antenna/circuit gain; and
    the transceiver transmits the power offset between uplink and downlink.

3. The apparatus according to claim 2, wherein the channel state information-reference signal resource identifier corresponding to the precoding matrix is determined according to the measurement of the downlink channel quality and the power offset between uplink and downlink.

4. The apparatus according to claim 1, wherein the transceiver receives uplink grant, including modulation and Coding Scheme which is based on the report of the measurement of the downlink channel quality from the base station.

5. The apparatus according to claim 4, wherein the transceiver receives uplink grant, including modulation and coding scheme which is based on the report of the measurement of the downlink channel quality and the power offset between uplink and downlink from the base station.

6. The apparatus according to claim 1, wherein the processor, learns available uplink ports from the channel state information-reference signal resource identifier indicated by the base station.

7. The apparatus according to claim 1, wherein the processor, learns available uplink ports from a dummy sounding reference signal resource identifier indicated by the base station, wherein, resources for the dummy sounding reference signal are associated with resources for the channel state information-reference signal indicated by the base station.

8. The apparatus according to claim 6, wherein the transceiver transmits a maximum number of supported uplink ports corresponding to resources for the channel state information-reference signal, as well as sets of resources for the channel state information-reference signal which can be transmitted simultaneously, to the base station by a higher layer message.

9. A method comprises:
    receiving a channel state information-reference signal (CSI-RS) resource identifier (CRI) that indicates a resource configuration for CSI-RS for downlink (DL) channel measurement;
    measuring a layer 1 reference signal received power (L1-RSRP) on the CSI-RS;
    transmitting a report of the L1-RSRP measurement to a base station;
    determining a precoding matrix for non-codebook (non-CB) uplink (UL) transmission based on the CRI and the L1-RSRP measurement in response to an UL frequency and a DL frequency being in a same band; and
    performing a non-CB UL transmission using the precoding matrix.

10. The method according to claim 9, further comprising:
    calculating a power offset between uplink and downlink based on a difference between uplink transmission power and downlink channel state information-reference signal transmission power, as well as a difference between transmission antenna/circuit gain and Receiving antenna/circuit gain; and
    transmitting the power offset between uplink and downlink.

11. The method according to claim 10, wherein, the channel state information-reference signal resource identifier corresponding to the precoding matrix is determined according to the measurement of the downlink channel quality and the power offset between uplink and downlink.

12. The method according to claim 9, further comprises receiving uplink grant, including modulation and coding scheme which is based on the report of the measurement of the downlink channel quality from the base station.

13. The method according to claim 12, further comprises receiving uplink grant, including modulation and coding scheme which is based on the report of the measurement of the downlink channel quality and the power offset between uplink and downlink from the base station.

14. An apparatus for wireless communication, the apparatus comprising:
    a transceiver;
    a processor; and
    a memory coupled to the processor, the processor configured to cause the apparatus to:
        transmit a channel state information-reference signal (CSI-RS) resource identifier (CRI) that indicates a resource configuration for CSI-RS for downlink (DL) channel measurement;

receive a report of a layer 1 reference signal received power (L1-RSRP) measurement on the CSI-RS; and receive a non-codebook (non-CB) uplink (UL) transmission using a precoding matrix, wherein the precoding matrix for the non-CB UL transmission based on the CRI and the L1-RSRP measurement in response to an UL frequency and a DL frequency being in a same band.

15. The apparatus according to claim 14, wherein;

the transceiver receives a power offset between uplink and downlink from the user equipment, wherein the power offset between uplink and downlink is based on a difference between uplink transmission power and downlink channel state information-reference signal transmission power, as well as a difference between transmission antenna/circuit gain and receiving antenna/circuit gain of the user equipment; and the processor determines ports used for uplink transmission based on the report of the measurement of the downlink channel quality and the power offset between uplink and downlink.

16. The apparatus according to claim 14, wherein the transceiver transmits uplink grant, including modulation and coding scheme which is based on the report of the measurement of the downlink channel quality to the user equipment.

17. The apparatus according to claim 16, wherein the transceiver transmits uplink grant, including modulation and Coding Scheme which is based on the report of the measurement of the downlink channel quality and the power offset between uplink and downlink to the user equipment.

18. The apparatus according to claim 14, wherein the processor indicates available uplink ports in a channel state information-reference signal resource identifier to the user equipment, wherein each of resources for the channel state information-reference signal corresponding to the available uplink ports belongs to different sets of resources for the channel state information-reference signal.

19. The apparatus according to claim 14, wherein the processor indicates available uplink ports in a dummy sounding reference signal resource identifier to the user equipment, wherein resources for the dummy sounding reference signal are associated with resources for the channel state information-reference signal indicated to the user equipment.

20. The apparatus according to claim 18, wherein the transceiver receives a higher layer message including a maximum number of supported uplink ports corresponding to resource for the channel state information-reference signal, as well as sets of resources for the channel state information-reference signal which can be transmitted simultaneously from the user equipment.

* * * * *